United States Patent [19]

Pastore

[11] Patent Number: 4,630,904
[45] Date of Patent: Dec. 23, 1986

[54] COMBINATION REAR VIEW MIRROR AND DIGITAL DISPLAYS

[76] Inventor: Ronald Pastore, 149 Heathcote Rd., Lindenhurst, N.Y. 11757

[21] Appl. No.: 693,368

[22] Filed: Jan. 22, 1985

[51] Int. Cl.⁴ ............................ G02B 5/08; G02B 7/18
[52] U.S. Cl. ....................................... 350/600; 340/98; 368/10
[58] Field of Search ........................ 350/600, 601, 642; 368/10; 340/98; 362/135

[56] References Cited

U.S. PATENT DOCUMENTS

| | | | |
|---|---|---|---|
| 2,166,303 | 7/1939 | Hodny et al. | 350/601 X |
| 2,580,014 | 12/1951 | Gazda | 350/601 X |
| 2,595,331 | 5/1952 | Calihan et al. | 350/600 X |
| 4,455,096 | 6/1984 | Brandstedt | 350/600 X |

Primary Examiner—Donald Watkins
Attorney, Agent, or Firm—Leonard Belkin

[57] ABSTRACT

A rear view mirror for a motor vehicle comprising a two-way mirror in which a tinted glass plate is mounted flush against a housing on one side with a rim bracket designed to keep out all light. The housing incorporates instruments and devices to show information by LED's including a digital clock, and a radar detector.

4 Claims, 4 Drawing Figures

COMBINATION REAR VIEW MIRROR AND DIGITAL DISPLAYS

BACKGROUND OF THE INVENTION

The present invention relates to rear view mirrors for automotive vehicles and more particularly to rear view mirrors for incorporating the display of information without sacrificing space on the mirror required for an adequate view of the road to the rear of the vehicle.

In my patent application for "Combination Rear View Mirror and Digital Clock", Ser. No. 571,820 filed on Jan. 18, 1984, now U.S. Pat. No. 4,588,267 I disclose a rear view mirror designed to accommodate a clock and the display of certain other information relating to the operation of the vehicle. In the application, display of the readout of the clock and other instruments is accomplished by removing silver, or not silvering, those parts of the mirror where the information is to be presented to the operator of the vehicle.

While the invention disclosed and claimed in my earlier application does represent an improvement in rear view mirrors, one of the drawbacks in such construction is that each additional bit of information to be accommodated results in the taking away of reflective surface of the mirror and hence less mirrored surface available for monitoring the roadway to the rear of the vehicle. This condition therefore limits the type and amount of information which can be displayed.

SUMMARY OF THE PRESENT INVENTION

In the present invention I improve upon my earlier invention by constructing a rear view mirror to be a two-way mirror in which the information to be displayed does not interfere with the actual use of the mirror except when information is actually displayed, and in that case, only over the limited area actually occupied by the display.

Much of the information which may be desired to have displayed in a rear view mirror may be that which is needed only under certain circumstances, such as when actually desired or certain events occur. For example, the alternator or oil pressure light would come on only in the event of a fault or failure. A radar detector would only produce a signal when the equipment is on and when there is radar signal to be detected. Other types of information might be displayed when called for by the operator in which case there could be provided a button or switch on the steering column or wheel to be actuated when the information is to be called for.

It is thus a principle object of this invention to provide a novel rear view mirror having provision for the display of information without detracting from the reflective surface of the mirror when the information is not being actually displayed.

Other objects and advantages of this invention will hereinafter become evident from the following description of a preferred embodiment of the invention.

DETAILED DESCRIPTION OF THE PREFERRED EMBODIMENT

Figure 1:
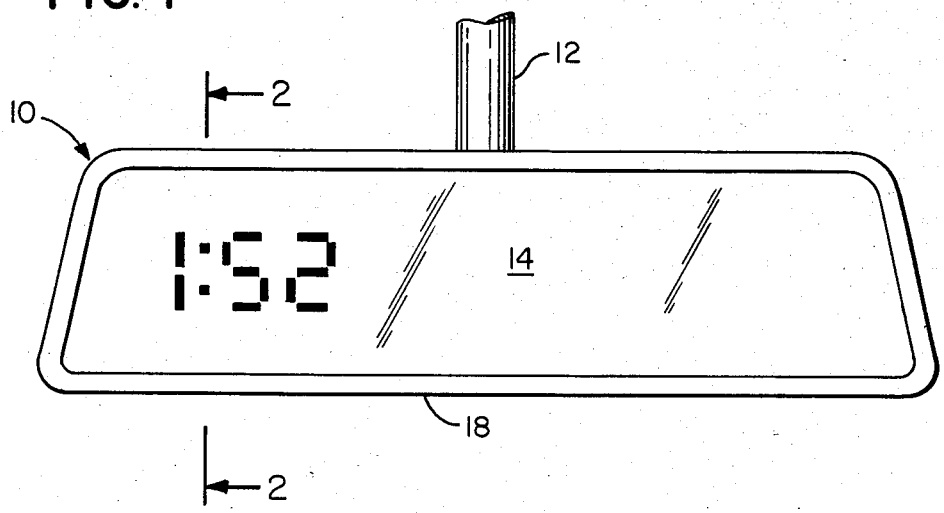
FIG. 1 is a front view of a rear view mirror embodying the principles of this invention showing a clock display.

Referring to FIG. 1 there is shown mirror 10 embodying the principles of this invention, supported by a mounting column 12, with only the time being displayed by light emitting diodes located behind the glass. It will be seen that the operator of the motor vehicle has virtually full use for viewing over the whole surface of the mirror because only the numerals themselves are shown, all space surrounding the actual numerals still functioning as a mirror.

Figure 2:
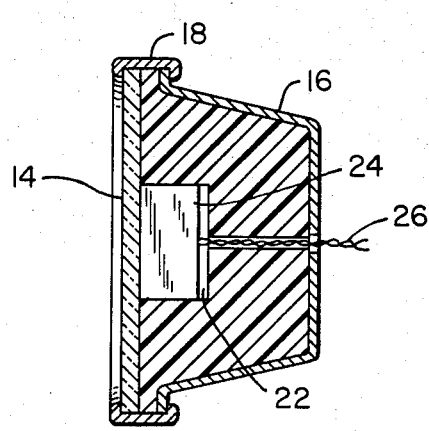
FIG. 2 is a cross sectional view taken along 2—2 of FIG. 1.

As seen in FIG. 2, mirror 10 is constructed of a sheet of tinted glass plate 14, polished on both sides on the back side of which is mounted a housing 16, and held together by a metal chip 18 along the circumference of mirror 10.

Housing 16 is of solid, dark (preferably black) plastic material with pockets, such as one or more pockets 22, to accommodate the displays desired, such as clock 24 with a conventional display of light emitting diodes (LED's). Double lead wire 26 leaves the rear of housing 16 through a suitable opening provided for source of electrical power and ground, said wire passing into column 12 for this purpose.

Tinted glass plate 14 functions as a mirror when the side opposite the viewing side is dark, as would be the case with housing 16 flush against plate 14 and a tight fitting clip 18 securely mounted along the perimeter as shown.

Figure 3:
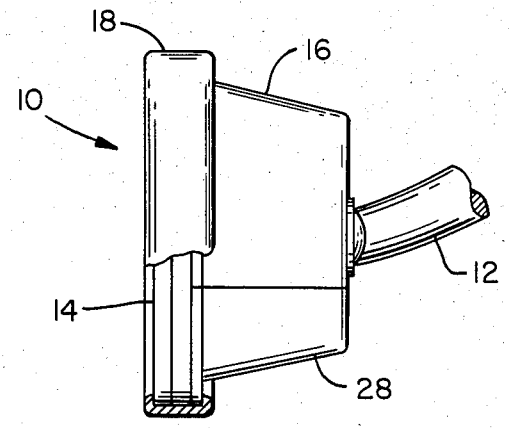
FIG. 3 is a right side view of the mirror in FIG. 1 with the rim partially cut away.
Figure 4:
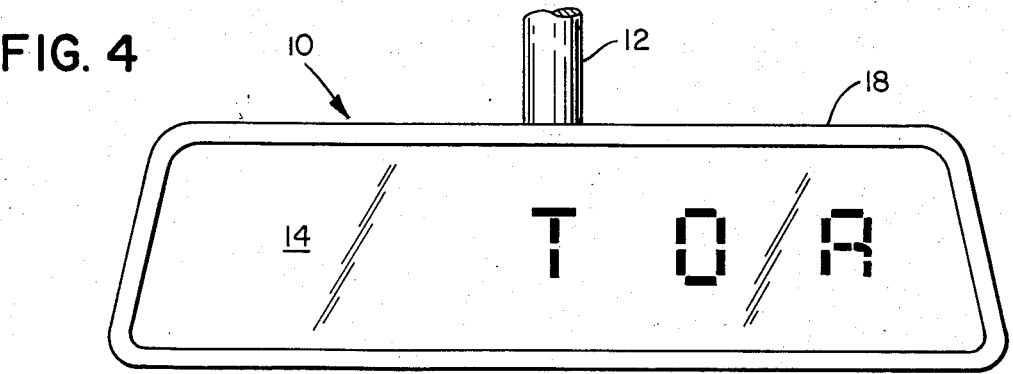
FIG. 4 is a front view of the mirror with other information displayed.

It is apparent from the above description of mirror 10 that any number of instruments or displays can be mounted in housing 16. For example, if desired, a radar detector 28, as shown in FIG. 3, can be mounted in or be made a part of housing 16, for producing the display of R for the presence of a radar signal, as shown in FIG. 4. Other information as well can be displayed, such as T for engine temperature, O for oil pressure, etc.

While only a preferred embodiment with certain novel features of this invention has been shown and described it is understood that various omissions, changes and additions in the forms and details of this invention of the device illustrated and in its operation can be made by those skilled in the art without departing from the principles of this invention as called for in the claims which follow.

What is claimed is:

1. An improved rear view mirror of the type used in motorized vehicles comprising a two-way mirror consisting of a plate of tinted glass and housing means mounted flush against one side of said glass plate, both supported by a mounting column, means consisting of a light emitting diode clock mounted along the perimeter of said glass plate joining said housing to said plate and preventing light from entering between said housing and plate, and recesses formed in said housing up against said plate wherein means are mounted flush with said glass plate for producing a light to display information, whereby in the absence of said light the full surface of said glass plate is available as a rear view mirror.

2. The improved rear view mirror of claim 1 wherein said mounted means also comprises at least one light which indicates the status of at least one important variable vehicle condition parameter.

3. The improved rear view mirror of claim 2 in which said housing includes as a part thereof a radar detector flush with said glass plate having an LED display facing said plate whereby a light is produced and is displaced through said glass plate when a radar signal is detected.

4. The improved rear view mirror of claim 3 in which the cables for each of said mounted means carrying multiple conductors for supplying electrical power and information passes out of the rear of said housing means into said mounting column.

* * * * *